(12) United States Patent  
Orita

(10) Patent No.: US 8,996,170 B2  
(45) Date of Patent: Mar. 31, 2015

(54) ACTUATING APPARATUS

(71) Applicant: Honda Motor Co., Ltd., Tokyo (JP)

(72) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 96 days.

(21) Appl. No.: 14/013,536

(22) Filed: Aug. 29, 2013

(65) Prior Publication Data

US 2014/0067117 A1   Mar. 6, 2014

(30) Foreign Application Priority Data

Aug. 31, 2012   (JP) .................................. 2012-191970

(51) Int. Cl.
*G05B 19/04* (2006.01)
*G05B 19/18* (2006.01)
*B25J 9/16* (2006.01)

(52) U.S. Cl.
CPC .............. *B25J 9/1633* (2013.01); *B25J 9/1641* (2013.01); *G05B 2219/39201* (2013.01)
USPC .......................................... 700/250; 700/245

(58) Field of Classification Search
USPC ................................................. 700/245–264
See application file for complete search history.

(56) References Cited

FOREIGN PATENT DOCUMENTS

JP   2005-349555   12/2005

*Primary Examiner* — Bhavesh V Amin
(74) *Attorney, Agent, or Firm* — Rankin, Hill & Clark LLP

(57) ABSTRACT

An actuating apparatus includes an actuator including flexible transmitting assemblies disposed between a plurality of joints, and a plurality of motors for actuating the joints. Each of the motors includes a variable rigidity element, the rigidity of which is variable in directions of rotation of the joints, and a controller for controlling the actuator. The controller includes a rigidity threshold value calculator for calculating rigidity threshold values of the joints, based on a required rigidity for a predetermined task position on a link and a coefficient matrix determined based on rotational angles of the motors.

5 Claims, 3 Drawing Sheets

ACTUATING APPARATUS

CROSS-REFERENCE TO RELATED APPLICATION

This application is based upon and claims the benefit of priority from Japanese Patent Application No. 2012-191970 filed on Aug. 31, 2012, the contents of which are incorporated herein by reference.

BACKGROUND OF THE INVENTION

1. Field of the Invention

The present invention relates to an actuating apparatus for actuating joints of a robot.

2. Description of the Related Art

Japanese Laid-Open Patent Publication No. 2005-349555 discloses an apparatus for controlling a robot arm having a flexible passive joint with improved controllability against model parameter errors and disturbances.

SUMMARY OF THE INVENTION

The apparatus disclosed in Japanese Laid-Open Patent Publication No. 2005-349555 is capable of imparting rigidity (e.g., elasticity) in directions of rotation of respective joints. However, the apparatus is unable to determine a level of rigidity in the directions of rotation of the respective joints, such that a required level of rigidity can be maintained at a certain task position (e.g., a hand tip position) on a robot arm.

It is an object of the present invention to provide an actuating apparatus for determining a level of rigidity in directions of rotation of respective joints, such that a required level of rigidity can be maintained at a certain task position (e.g., a hand tip position) on a robot arm.

According to the present invention, there is provided an actuating apparatus comprising an actuator including a link having a plurality of joints, a plurality of rotary prime movers for actuating the joints, and a plurality of flexible transmitting assemblies disposed respectively between the joints and the rotary prime movers, each of the flexible transmitting assemblies including a variable rigidity element a rigidity of which is variable in directions of rotation of the joints, and a controller for controlling the actuator, wherein the controller includes a rigidity threshold value calculator for calculating rigidity threshold values for the joints, based on a required rigidity for a predetermined task position on the link and a coefficient matrix determined based on rotational angles of the rotary prime movers.

In the above actuating apparatus, the rigidity threshold value calculator may use, as the rigidity threshold values for the joints, a diagonal element of a matrix, which is obtained by calculating the product of a transposed matrix of the coefficient matrix, a matrix representing the rigidity at the task position, and the coefficient matrix.

In the above actuating apparatus, the controller may further include a rigidity determiner for determining a rigidity of the joints, which is equal to or greater than the rigidity threshold values for the joints, and a rigidity change controller for changing the rigidity of the variable rigidity elements of each of the joints, such that the rigidity of the joints will be equivalent to the rigidity of the joints determined by the rigidity determiner.

In the above actuating apparatus, the flexible transmitting assembly may include a variable viscosity coefficient element for varying a viscosity coefficient in directions of rotation of the joints, and the controller may further include an inherent frequency calculator for using, as a self inherent vibrational component of the joints, the square root of a diagonal element of a matrix produced by calculating the product of a matrix representing the rigidity of the variable rigidity element, which is changed by the rigidity change controller, and an inverse matrix of an inertia matrix of the actuator, which is determined based on the rotational angles of the rotary prime movers, a viscosity coefficient calculator for calculating a viscosity coefficient of the joints, using the self inherent vibrational component of the joints and a diagonal element of the inertia matrix, and a viscosity change controller for changing a viscosity coefficient of the variable viscosity coefficient element of the joints, such that the viscosity coefficient of the joints will be equivalent to the viscosity coefficient of the joints calculated by the viscosity coefficient calculator.

According to the present invention, there also is provided an actuating apparatus comprising an actuator including a link having a plurality of joints, a plurality of rotary prime movers for actuating the joints, and a plurality of flexible transmitting assemblies disposed respectively between the joints and the rotary prime movers, the flexible transmitting assemblies each including a variable viscosity coefficient element a viscosity coefficient of which is variable in directions of rotation of the joints, and a controller for controlling the actuator, wherein the controller includes an inherent frequency calculator for using, as a self inherent vibrational component of the joints, the square root of a diagonal element of a matrix produced by calculating the product of a matrix representing the rigidity of the joints and an inverse matrix of an inertia matrix of the actuator, which is determined based on rotational angles of the rotary prime movers, a viscosity coefficient calculator for calculating a viscosity coefficient of the joints, using a self inherent vibrational component of the joints and a diagonal element of the inertia matrix, and a viscosity change controller for changing a viscosity coefficient of the variable viscosity coefficient element of the joints, such that the viscosity coefficient of the joints will be equivalent to the viscosity coefficient of the joints calculated by the viscosity coefficient calculator.

According to the present invention, since rigidity threshold values for the joints are calculated based on a required rigidity for the predetermined task position on the link, and the coefficient matrix is determined based on rotational angles of the rotary prime movers, the rigidity threshold values of the joints can be determined so as to satisfy the required rigidity for the predetermined task position.

According to the present invention, furthermore, the square root of the diagonal element of the matrix obtained by calculating the product of the matrix representing the rigidity of the joints and the inverse matrix of the inertia matrix of the actuator, which is determined based on the rotational angles of the rotary prime movers, is used as a self inherent vibrational component of the joints. Further, the viscosity coefficient of the joints is calculated using the self inherent vibrational component of the joints and the diagonal element of the inertia matrix. Consequently, vibrations of the joints can be suppressed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An actuating apparatus according to a preferred embodiment of the present invention will be described in detail below with reference to the accompanying drawings.

Figure 1:
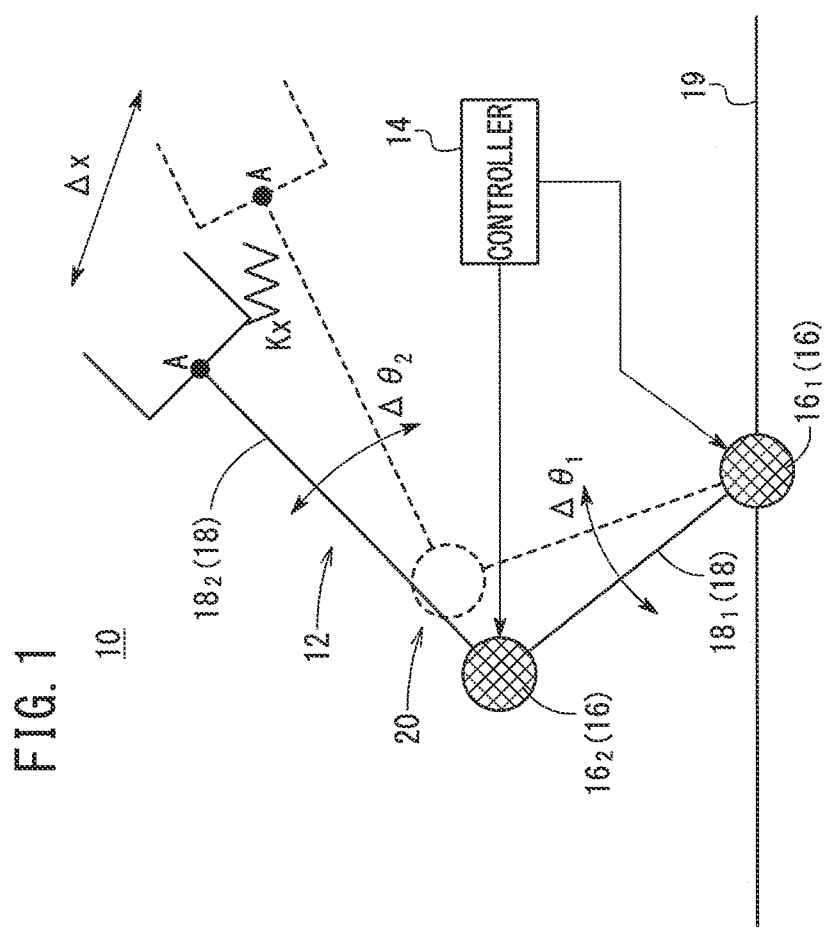
FIG. 1 is a diagram showing an actuating apparatus according to an embodiment of the present invention.

FIG. 1 shows an actuating apparatus 10 according to an embodiment of the present invention. As shown in FIG. 1, the actuating apparatus 10 includes an actuator 12, and a controller 14 for controlling the actuator 12. The actuator 12 includes a link 20 having a plurality of joints 16 ($16_1$, $16_2$) and a plurality of connectors 18 ($18_1$, $18_2$). The connectors 18 are interconnected through the joints 16. The joint $16_1$ at the foundation of the link 20 is mounted on a base 19.

As shown in FIG. 1, the distance that a predetermined task position, e.g., a hand tip position A in the present embodiment, on the link 20 has traveled is denoted by $\Delta x$, the rotational angle through which the joint $16_1$ is turned is denoted by $\Delta\theta_1$, and the rotational angle through which the joint $16_2$ is turned is denoted by $\Delta\theta_2$. The rigidity at the hand tip position A is denoted by Kx.

In FIG. 1, the actuator 12 is shown as having two joints 16 ($16_1$, $16_2$) and two connectors 18 ($18_1$, $18_2$). However, the actuator 12 according to the present embodiment will be described below as having n joints 16 and n connectors 18. Each of the n joints 16 will be referred to as a joint $16_i$, and each of the n connectors 18 will be referred to as a connector $18_i$. The rotational angle of a joint $16_i$ will be referred to as $\Delta\theta_i$, where i is represented by i=1, 2, . . . , n, which indicates the number of the joint 16, the connector 18, or the rotational angle.

Figure 2:
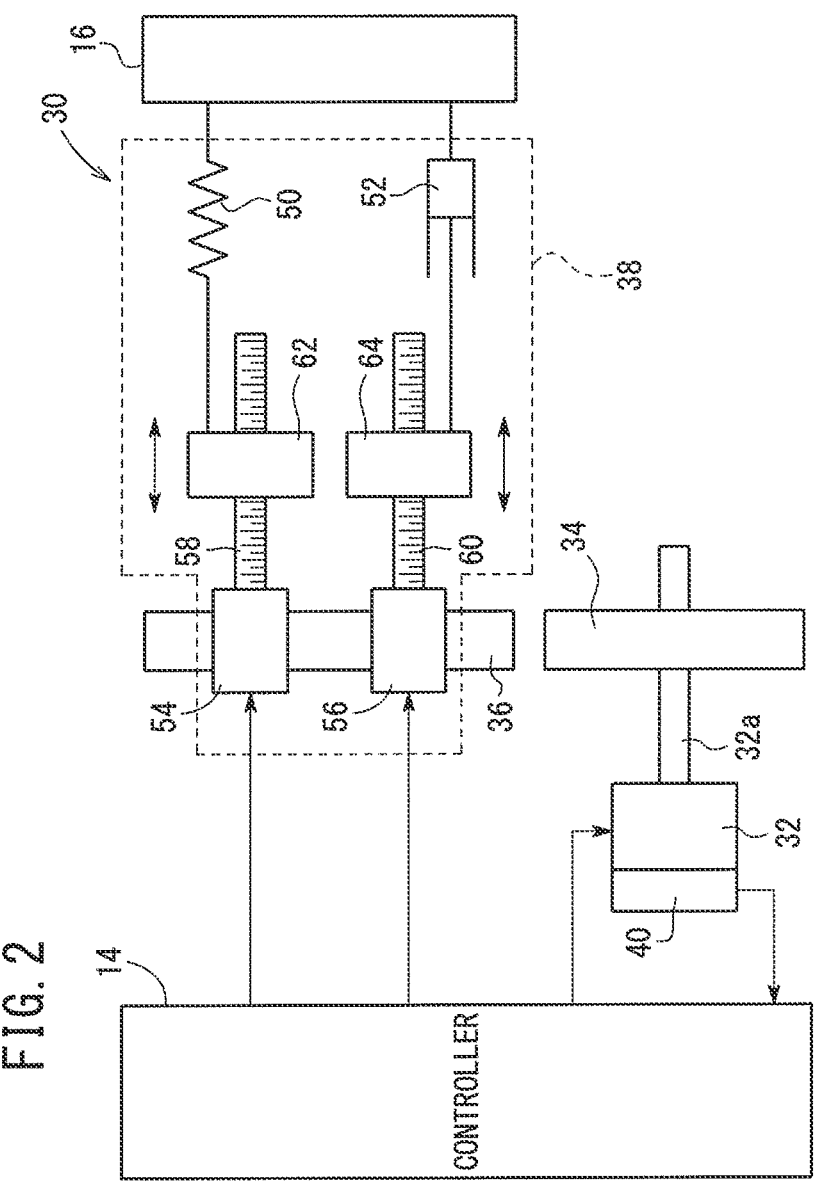
FIG. 2 is a schematic view of the structure of a joint actuating system of an actuator of the actuating apparatus according to the embodiment.

FIG. 2 schematically shows the configuration of a joint actuating system 30 for actuating each of the joints 16 of the actuator 12 according to the present embodiment. As shown in FIG. 2, the joint actuating system 30 includes a motor (rotary prime mover) 32, a drive gear 34, a driven gear 36, and a flexible transmitting assembly 38. The joint 16 is operatively connected to the motor 32 through the flexible transmitting assembly 38.

The motor 32 is an electric motor, which is supplied with electric energy from a non-illustrated electric power supply in order to generate a torque that serves to rotate an output shaft 32a, which is connected to the motor 32, about its axis. The drive gear 34 is mounted on the output shaft 32a. The motor 32 is combined with a rotary encoder 40 for detecting an angle of rotation of the motor 32.

The driven gear 36 is held in mesh with the drive gear 34, so that the driven gear 36 is rotated upon rotation of the drive gear 34. The driven gear 36 rotates at a rotational speed, which is lower than the rotational speed of the drive gear 34. Therefore, the drive gear 34 and the driven gear 36 jointly make up a speed reducer.

The flexible transmitting assembly 38 includes a variable rigidity element 50, a variable viscosity coefficient element 52, a rigidity changer 54, a viscosity coefficient changer 56, screw shafts 58, 60, and nuts 62, 64. The variable rigidity element 50 comprises a nonlinear spring, the rigidity of which in the directions of rotation of the joint 16 varies when the spring is displaced. The variable viscosity coefficient element 52 comprises a nonlinear damper, the viscosity coefficient of which in the directions of rotation of the joint 16 varies when the damper is displaced.

The rigidity changer 54 comprises a drive source for rotating the screw shaft 58 based on a voltage applied thereto. Similarly, the viscosity coefficient changer 56 comprises a drive source for rotating the screw shaft 60 based on a voltage applied thereto. The rigidity changer 54 and the viscosity coefficient changer 56 are supplied with electric energy from a non-illustrated electric power supply. The nut 62, which is threaded over the screw shaft 58, is movable axially along the screw shaft 58 to the left or the right in FIG. 1 when the screw shaft 58 is rotated about its axis by the rigidity changer 54. The nut 64, which is threaded over the screw shaft 60, is movable axially along the screw shaft 60 to the left or the right in FIG. 1 when the screw shaft 60 is rotated about its axis by the viscosity coefficient changer 56.

If the voltage applied to the rigidity changer 54 and the viscosity coefficient changer 56 is increased, the rigidity changer 54 and the viscosity coefficient changer 56 rotate the screw shafts 58, 60 respectively in directions to move the nuts 62, 64 to the right in FIG. 1. If the voltage applied to the rigidity changer 54 and the viscosity coefficient changer 56 is decreased, the rigidity changer 54 and the viscosity coefficient changer 56 rotate the screw shafts 58, 60 respectively in directions to move the nuts 62, 64 to the left in FIG. 1. If the voltage applied to the rigidity changer 54 and the viscosity coefficient changer 56 remains constant, the respective screw shafts 58, 60 are not rotated, thereby keeping the nuts 62, 64 at rest. If voltages are not applied to the rigidity changer 54 and the viscosity coefficient changer 56, the rigidity changer 54 and the viscosity coefficient changer 56 rotate the screw shafts 58, 60 respectively in directions to move the nuts 62, 64 to the leftmost position in FIG. 1.

When the nut 62 moves to the right, the nut 62 presses the variable rigidity element 50, thereby displacing the variable rigidity element 50 to the right over a distance commensurate with the distance that the nut 62 moves. On the other hand, when the nut 62 moves to the left, the nut 62 releases the variable rigidity element 50, thereby displacing the variable rigidity element 50 to the left over a distance commensurate with the distance that the nut 62 moves. When the nut 64 moves to the right, the nut 64 presses the variable viscosity coefficient element 52, thereby displacing the variable viscosity coefficient element 52 to the right over a distance commensurate with the distance that the nut 62 moves. On the other hand, when the nut 64 moves to the left, the nut 64 releases the variable viscosity coefficient element 52, thereby displacing the variable viscosity coefficient element 52 to the left over a distance commensurate with the distance that the nut 62 moves. Therefore, the rigidity of the variable rigidity element 50 and the viscosity coefficient of the variable viscosity coefficient element 52 can be varied depending on the voltages applied respectively to the rigidity changer 54 and the viscosity coefficient changer 56.

In FIG. 2, the variable rigidity element 50 is shown as applying a force depending on the rigidity and the displacement thereof to the left or right. Further, the variable viscosity coefficient element 52 is shown as applying a force depending on the viscosity coefficient and the speed of displacement thereof to the left or right. Actually, however, the variable rigidity element 50 and the variable viscosity coefficient element 52 apply respective forces in a direction of rotation of the joint 16. Thus, the rigidity of the variable rigidity element 50 refers to the rigidity in the direction of rotation of the joint 16, and the viscosity coefficient of the variable viscosity coefficient element 52 refers to the viscosity coefficient in the direction of rotation of the joint 16. If the voltage applied to the rigidity changer 54 is increased, the rigidity of the variable rigidity element 50 in the direction of rotation of the joint 16 increases. If the voltage applied to the viscosity coefficient changer 56 is increased, the viscosity coefficient of the variable viscosity coefficient element 52 in the direction of rotation of the joint 16 increases. The variable rigidity element 50 and the variable viscosity coefficient element 52 transmit a torque, which is output from the driven gear 36, to the joint 16, thereby rotating the joint 16.

As shown in FIG. 1, if the link 20 is supported at a certain posture by a matrix Kr (N·m/rad) representing the rigidity in the direction of rotation of the plural joints 16, then a matrix representing the rigidity of the hand tip position A on the link 20 is denoted by Kx, and the distance by which the hand tip position A is displaced is denoted by $\Delta x$. In this case, the force F applied to the hand tip position A is expressed by the following equation (1):

$$F = Kx \cdot \Delta x \quad (1)$$

$$\Rightarrow \begin{pmatrix} f_1 \\ f_2 \\ \vdots \\ f_n \end{pmatrix} = \begin{pmatrix} kx_{11} & \cdots & kx_{1n} \\ \vdots & \ddots & \vdots \\ kx_{n1} & \cdots & kx_{nn} \end{pmatrix} \begin{pmatrix} \Delta x_1 \\ \Delta x_2 \\ \vdots \\ \Delta x_n \end{pmatrix}$$

where $f_1, f_2, \ldots, f_n$ represent components in respective directions of the force F applied to the hand tip position A, e.g., an x-axis direction, a y-axis direction, a direction of rotation about the x-axis, and a direction of rotation about the y-axis, and $\Delta x_1, \Delta x_2, \ldots, \Delta x_n$ represent components in respective directions of a change $\Delta x$ of the hand tip position A, e.g., components in the x-axis direction and the y-axis direction. The number of components of force F, and the number of components of the change $\Delta x$ of the hand tip position A can be set to any desired value. The elements of the matrix Kx are represented by $kx_{gh}$ (g, h=1, 2, ..., n).

If the angle of rotation of a joint 16 is denoted by $\Delta\theta$, then a torque $\tau$ applied to the joint 16 is calculated according to the following equation (2) from the angle of rotation detected by the rotary encoder 40.

$$\tau = Kr \cdot \Delta\theta \quad (2)$$

$$\Rightarrow \begin{pmatrix} \tau_1 \\ \tau_2 \\ \vdots \\ \tau_n \end{pmatrix} = \begin{pmatrix} kr_{11} & \cdots & kr_{1n} \\ \vdots & \ddots & \vdots \\ kr_{n1} & \cdots & kr_{nn} \end{pmatrix} \begin{pmatrix} \Delta\theta_1 \\ \Delta\theta_2 \\ \vdots \\ \Delta\theta_n \end{pmatrix}$$

where $\tau$ is a vector representation of respective torques $\tau_i$ applied to each of the joints $\mathbf{16}_i$, and $\Delta\theta$ is a vector representation of respective angles of rotation $\Delta\theta_i$ of the joints $\mathbf{16}_i$. The elements of the matrix Kr are represented by $kr_{gh}$ (g, h=1, 2, ..., n).

$\Delta x$, $\Delta\theta$ can be expressed according to the following equation (3), using a Jacobian matrix (coefficient matrix) J. The Jacobian matrix J is determined depending on the hand tip position A and rotational angles of the motors 32 that actuate the respective joints 16.

$$\Delta x = J \cdot \Delta\theta \quad (3)$$

where $$J = \begin{pmatrix} j_{11} & \cdots & j_{1n} \\ \vdots & \ddots & \vdots \\ j_{n1} & \cdots & j_{nn} \end{pmatrix}$$

The torque $\tau$ applied to each joint 16 and the force F applied to the hand tip position A can be expressed according to the following equation (4), using a transposed matrix of the Jacobian matrix J.

$$\tau = J^T \cdot F \quad (4)$$

Using equations (1) through (4), therefore, the following equation (5) can be derived.

$$Kr = J^T \cdot Kx \cdot J \quad (5)$$

As described above, the matrix Kr representing minimum rigidity, which is required for the plural joints 16, can be determined from the matrix Kx, which represents the required rigidity for the hand tip position A on the link 20. In order to make the rigidity of the hand tip position A on the link 20 equal to or greater than the required rigidity Kx, a matrix Km representing rigidity of the plural joints 16 must at least satisfy the inequality Km≥Kr. The inequality Km≥Kr indicates that the respective elements (rigidity) $km_{gh}$ of the matrix Km are equal to or greater than the respective elements (rigidity threshold) $kr_{gh}$ of the corresponding matrix Kr. In other words, each of the elements should satisfy the inequality $km_{gh} \geq kr_{gh}$.

If the matrix representing rigidity of the plural joints 16 is represented by Km, then when the plural joints 16 are rotated, the torques $\tau$ that are applied to the plural joints 16 can be expressed according to the following equation (6):

$$\tau = Km \cdot \Delta\theta \quad (6)$$

$$\Rightarrow \begin{pmatrix} \tau_1 \\ \tau_2 \\ \vdots \\ \tau_n \end{pmatrix} = \begin{pmatrix} km_{11} & \cdots & km_{1n} \\ \vdots & \ddots & \vdots \\ km_{n1} & \cdots & km_{nn} \end{pmatrix} \begin{pmatrix} \Delta\theta_1 \\ \Delta\theta_2 \\ \vdots \\ \Delta\theta_n \end{pmatrix}$$

From equation (6), the torque $\tau_1$ applied to the joint $\mathbf{16}_1$ is expressed by $\tau_1 = km_{11} \times \Delta\theta_1 + km_{12} \times \Delta\theta_2 + \ldots + km_{1n} \times \Delta\theta_n$. Therefore, the torque $\tau_1$ applied to the joint $\mathbf{16}_1$ is affected by components (components in second and subsequent terms of the above equation), which are represented by the angles of rotation $\Delta\theta_i$ of the joints $\mathbf{16}_i$ other than the joint $\mathbf{16}_1$.

Similarly, the torque $\tau_2$ applied to the joint $\mathbf{16}_2$ is expressed by $\tau_2 = km_{21} \times \Delta\theta_1 + km_{22} \times \Delta\theta_2 + \ldots + km_{2n} \times \Delta\theta_n$. Therefore, the torque $\tau_2$ applied to the joint $\mathbf{16}_2$ is affected by components (components in first, third, and subsequent terms of the above equation), which are represented by the angles of rotation $\Delta\theta_i$ of the joints $\mathbf{16}_i$ other than the joint $\mathbf{16}_2$.

Concerning the torques $\tau_i$, components thereof other than the rotational angles $\Delta\theta_i$ of the joints $\mathbf{16}_i$ are regarded as disturbances, and the diagonal elements $km_{ii}$ of the matrix Km are extracted, i.e., elements other than the diagonal elements of the matrix Km are set to 0, thereby removing the disturbances.

Therefore, $km_{11}$, which is a diagonal element of the matrix Km, represents the rigidity of the joint $\mathbf{16}_1$, and $km_{22}$, which is another diagonal element of the matrix Km, represents the rigidity of the joint $16_2$. In this manner, the diagonal elements $km_{ii}$ of the matrix Km represent rigidities of the joints $16_i$. Torques $\tau_i$ applied to the joints $16_i$ are expressed by the product $km_{ii} \times \Delta\theta_i$.

With the rigidities of the joints $16_i$ being expressed as respective rigidities $km_{ii}$, the required rigidity for the hand tip position A can be satisfied.

Inasmuch as the rigidities $km_{ii}$ of the joints $16_i$ cannot be set to values higher than the mechanical rigidities $k_i$ of the joints $16_i$, the rigidities $km_{ii}$ of the joints $16_i$ must satisfy the relationship $k_i \geq km_{ii} \geq kr_{ii}$. The mechanical rigidities $k_i$ represent maximum rigidities in the directions of rotation of the variable rigidity elements 50 of the joints $16_i$.

An equation of motion for the joints 16 is expressed as follows:

$$M \cdot dd\Delta\theta = -Km \cdot \Delta\theta \quad (7)$$

where $$M = \begin{pmatrix} m_{11} & \cdots & m_{1n} \\ \vdots & \ddots & \vdots \\ m_{n1} & \cdots & m_{nn} \end{pmatrix}$$

and where M represents an inertia matrix indicating a moment of inertia (inertia) of the actuator 12, and $dd\Delta\theta$ represents a second-order differential of $\Delta\theta$, which is indicative of a rotational angular acceleration. Equation (7) can be modified and rewritten as the following equation (8). In equation (8), elements of the matrix $M^{-1} \cdot Km$ are represented by $s_{gh}$ (g, h=1, 2, ..., n). The inertia matrix M is determined by the angles of rotation of the motors 32, which actuate the respective joints 16.

$$dd\Delta\theta = -M^{-1} \cdot Km \cdot \Delta\theta \quad (8)$$

$$\Rightarrow \begin{pmatrix} dd\Delta\theta_1 \\ dd\Delta\theta_2 \\ \vdots \\ dd\Delta\theta_n \end{pmatrix} = \begin{pmatrix} s_{11} & \cdots & s_{1n} \\ \vdots & \ddots & \vdots \\ s_{n1} & \cdots & s_{nn} \end{pmatrix} \begin{pmatrix} \Delta\theta_1 \\ \Delta\theta_2 \\ \vdots \\ \Delta\theta_n \end{pmatrix}$$

where $$M^{-1} \cdot Km = \begin{pmatrix} s_{11} & \cdots & s_{1n} \\ \vdots & \ddots & \vdots \\ s_{n1} & \cdots & s_{nn} \end{pmatrix}$$

From equation (8), the rotational angular acceleration $dd\Delta\theta_1$ of the joint $16_1$ is expressed by $dd\Delta\theta_1 = -(s_{11} \times \Delta\theta_1 + s_{12} \times \Delta\theta_2 + \ldots + s_{1n} \times \Delta\theta_n)$. The rotational angular acceleration $dd\Delta\theta_1$ of the joint $16_1$ is affected by components (components in second and subsequent terms of the above equation), which are represented by rotational angular accelerations $dd\Delta\theta_n$ of the joints $16_i$ other than the joint $16_1$.

Similarly, the rotational angular acceleration $dd\Delta\theta_2$ of the joint $16_2$ is expressed by $dd\Delta\theta_2 = -(s_{21} \times \Delta\theta_1 + s_{22} \times \Delta\theta_2 + \ldots + s_{2n} \times \Delta\theta_n)$. The rotational angular acceleration $dd\Delta\theta_2$ of the joint $16_2$ is affected by components (components in first, third, and subsequent terms of the above equation), which are represented by rotational angular accelerations $dd\Delta\theta_n$ of the joints $16_i$ other than the joint $16_2$.

Concerning the rotational angular accelerations $dd\Delta\theta_i$, components thereof other than the rotational angles $\Delta\theta_i$ of the joint $16_i$ are regarded as disturbances, and the diagonal elements $s_{ii}$ of the matrix $M^{-1} \cdot Km$ are extracted, thereby removing such disturbances. Accordingly, self inherent vibrational components (self inherent frequencies) $\omega_i$ of the joints $16_i$ can be expressed according to the following equation (9):

$$\omega_i = \sqrt{s_{ii}} \quad (9)$$

Therefore, the viscosity coefficients $d_i$ of the joints $16_i$ can be expressed according to the following equation (10). In equation (10), $m_{ii}$ represents diagonal elements of the inertia matrix M, and $\zeta$ represents a damping ratio.

$$d_i = 2 \cdot m_{ii} \cdot \omega_i \cdot \zeta (0 < \zeta < 1) \quad (10)$$

The viscosity coefficient $d_1$ serves as a viscosity coefficient for the joint $16_1$, whereas the viscosity coefficient $d_2$ serves as a viscosity coefficient for the joint $16_2$. Thus, the viscosity coefficients $d_i$ serve as respective viscosity coefficients for the plural joints $16_i$.

With the viscosity coefficients of the joints $16_i$ being represented as respective viscosity coefficients $d_i$, vibrations of the joints $16_i$ having determined rigidities $km_{ii}$ can be suppressed.

Figure 3:
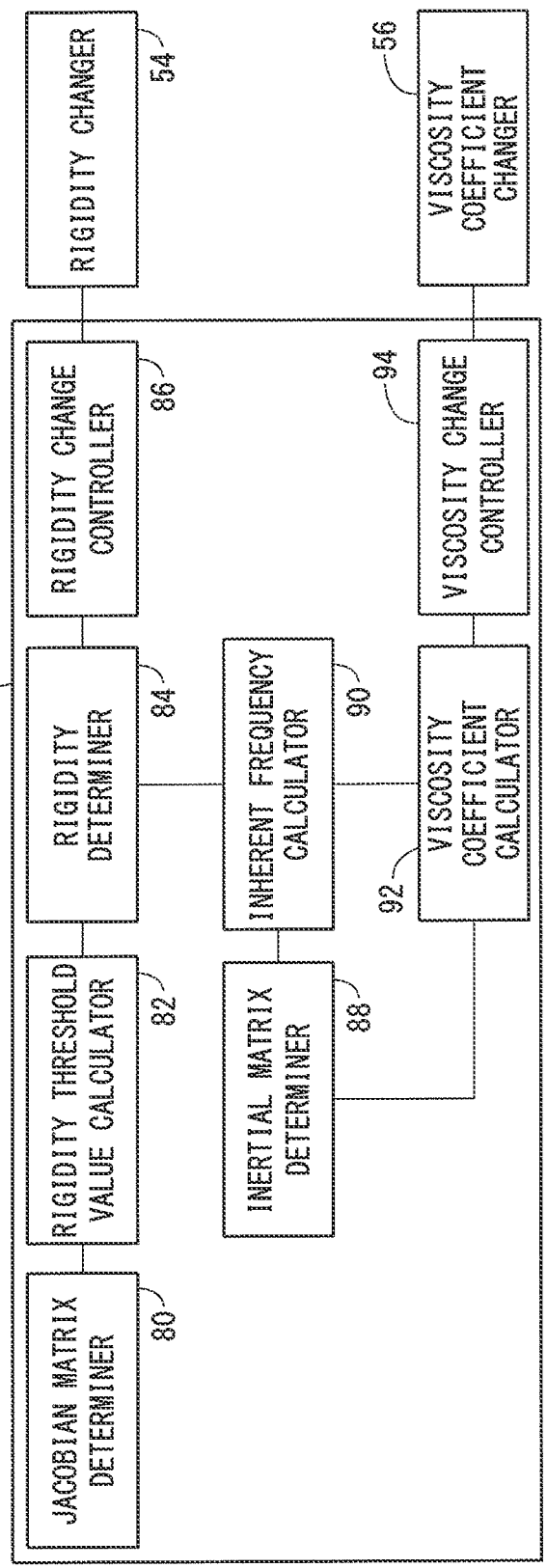
FIG. 3 is a functional block diagram of a controller of the actuating apparatus according to the embodiment.

FIG. 3 is a functional block diagram of the controller 14. As shown in FIG. 3, the controller 14 includes a Jacobian matrix determiner 80, a rigidity threshold value calculator 82, a rigidity determiner 84, a rigidity change controller 86, an inertia matrix determiner 88, an inherent frequency calculator 90, a viscosity coefficient calculator 92, and a viscosity change controller 94.

The Jacobian matrix determiner 80 determines a Jacobian matrix J that depends on the rotational angles $\Delta\theta_i$ of the motors 32, which are calculated by the rotary encoders 40 of the joints $16_i$ and the hand tip position A. The hand tip position A may be detected by a gyro sensor or the like, which is disposed in the hand tip position A, or alternatively, may be calculated from the rotational angles $\Delta\theta_1$ of the joints $16_i$. Calculations for the Jacobian matrix J are well known in the art and will not be described below. The Jacobian matrix determiner 80 outputs the determined Jacobian matrix to the threshold value calculator 82.

The threshold value calculator 82 calculates rigidity threshold values Kr of the plural joints 16 based on a required rigidity Kx for the hand tip position A, and the Jacobian matrix J determined by the Jacobian matrix determiner 80. More specifically, the threshold value calculator 82 calculates rigidity threshold values Kr of the plural joints 16 according to equation (5). The elements $kr_{gh}$ of the matrix Kr serve as rigidity threshold values.

The rigidity determiner 84 determines a matrix Km, which is equal to or greater than the matrix Kr. More specifically, the rigidity determiner 84 determines a matrix Km such that the elements $km_{gh}$ of the matrix Km are equal to or greater than corresponding elements $kr_{gh}$ of the matrix Kr. The rigidity determiner 84 outputs the determined matrix Km to the rigidity change controller 86 and the inherent frequency calculator 90.

The rigidity change controller 86 changes rigidities of the variable rigidity elements 50 of the plural joints 16 by applying voltages corresponding to the determined matrix Km to the rigidity changers 54 of the plural joints 16. In the present embodiment, the elements $km_{gh}$, other than the diagonal components, of the matrix Km are regarded as disturbances. The rigidity change controller 86 extracts the diagonal elements $km_{ii}$ of the matrix Km, and applies voltages to the rigidity changers 54 of the plural joints 16, so that the rigidities of the joints $16_i$ are represented by the diagonal elements $km_{ii}$ of the determined matrix Km.

The diagonal elements $km_{ii}$ of the determined matrix Km are set to satisfy the relationship $k_i \geq km_{ii} \geq kr_{ii}$, where $k_i$ represents mechanical rigidities of the joints $16_i$, i.e., maximum rigidities of the variable rigidity elements 50 of the joints $16_i$.

The inertia matrix determiner 88 calculates an inertia matrix M representing moments of inertia of the actuator 12, based on rotational angles $\Delta\theta_i$ of the motors 32, which are calculated by the rotary encoders 40 of the joints $16_i$. Calculations for obtaining the inertia matrix M are well known in the art and will not be described below. The inertia matrix determiner 88 outputs the calculated inertia matrix M to the inherent frequency calculator 90 and the viscosity coefficient calculator 92.

The inherent frequency calculator 90 uses, as self inherent vibrational components $\omega_i$ of the joints $16_i$, a square root of the diagonal elements $s_{ii}$ of a matrix, which is obtained by calculating the product of an inverse matrix $M^{-1}$ of the inertia matrix M and the matrix Km. More specifically, the inherent frequency calculator 90 calculates self inherent vibrational components $\omega_i$ of the joints $16_i$ according to equation (9), and based on the inertia matrix M and the determined matrix Km representing rigidities of the plural joints 16. The inherent frequency calculator 90 outputs the calculated self inherent vibrational components $\omega_i$ to the viscosity coefficient calculator 92.

The inherent frequency calculator 90 may determine a matrix by calculating the product of a matrix in which elements other than the diagonal elements $km_{ii}$ of the matrix Km are set to 0, and the inverse matrix $M^{-1}$ of the inertia matrix M. This is because the diagonal elements of the determined matrix are of the same value as the diagonal elements $s_{ii}$ of the matrix produced by calculating the product of the matrix Km and the inverse matrix M.

The viscosity coefficient calculator 92 calculates viscosity coefficients $d_i$ for each of the joints $16_i$ using the self inherent vibrational components $\omega_i$ of the joints $16_i$ and the diagonal elements $m_{ii}$ of the inertia matrix M. More specifically, the viscosity coefficient calculator 92 calculates viscosity coefficients $d_i$ for the respective joints $16_i$ according to equation (10). The viscosity coefficient calculator 92 outputs the calculated viscosity coefficients $d_i$ to the viscosity change controller 94.

The viscosity change controller 94 changes viscosity coefficients of the variable viscosity coefficient elements 52 of the plural joints 16 by applying voltages corresponding to the calculated viscosity coefficients $d_i$ to the viscosity coefficient changers 56 of the respective joints $16_i$. More specifically, the viscosity change controller 94 applies voltages to the viscosity coefficient changers 56 of each of the joints $16_i$, so that the viscosity coefficients of the joints $16_i$ will reach the calculated viscosity coefficients $d_i$.

As described above, since rigidity threshold values $kr_{ii}$ of the joints $16_i$ are calculated based on a required rigidity Kx for the predetermined hand tip position A on the link 20, and based on the Jacobian matrix J, which is determined based on rotational angles $\Delta\theta$ of the motors 32 that actuate the plural joints 16, the rigidity threshold values $kr_{ii}$ of the joints $16_i$ can be determined in order to satisfy the required rigidity for the hand tip position A.

Furthermore, the square root of the diagonal elements $s_{ii}$ of a matrix obtained by calculating the product of the matrix M representing the rigidity of the plural joints 16 and an inverse matrix $M^{-1}$ of the inertia matrix M of the actuator 12, which is determined based on the rotational angles $\Delta\theta$ of the plural motors 32, is used as self inherent vibrational components $\omega_i$ of the joints $16_i$. Further, the viscosity coefficients $d_i$ of the joints $16_i$ are calculated using the self inherent vibrational components $\omega_i$ of the joints $16_i$ and the diagonal elements $m_{ii}$ of the inertia matrix M. Consequently, vibrations of the joints 16 can be suppressed.

While a preferred embodiment of the present invention has been described, the technical scope of the present invention is not limited to the illustrated embodiment. It will be obvious to those skilled in the art that various changes and modifications may be made to the above embodiment. Such changes and modifications should be interpreted as being covered by the technical scope of the present invention as set forth in the appended claims.

What is claimed is:

1. An actuating apparatus comprising:
   an actuator including a link having a plurality of joints, a plurality of rotary prime movers for actuating the joints, and a plurality of flexible transmitting assemblies disposed respectively between the joints and the rotary prime movers, each of the flexible transmitting assemblies including a variable rigidity element a rigidity of which is variable in directions of rotation of the joints; and
   a controller for controlling the actuator,
   wherein the controller includes a rigidity threshold value calculator for calculating rigidity threshold values for the joints, based on a required rigidity for a predetermined task position on the link and a coefficient matrix determined based on rotational angles of the rotary prime movers.

2. The actuating apparatus according to claim 1, wherein the rigidity threshold value calculator uses, as the rigidity threshold values for the joints, a diagonal element of a matrix, which is obtained by calculating a product of a transposed matrix of the coefficient matrix, a matrix representing the rigidity at the task position, and the coefficient matrix.

3. The actuating apparatus according to claim 1, wherein the controller further includes:
   a rigidity determiner for determining a rigidity of the joints, which is equal to or greater than the rigidity threshold values for the joints; and
   a rigidity change controller for changing the rigidity of the variable rigidity elements of each of the joints, such that the rigidity of the joints will be equivalent to the rigidity of the joints determined by the rigidity determiner.

4. The actuating apparatus according to claim 3, wherein the flexible transmitting assembly includes a variable viscosity coefficient element for varying a viscosity coefficient in directions of rotation of the joints; and
   the controller further includes:
   an inherent frequency calculator for using, as a self inherent vibrational component of the joints, the square root of a diagonal element of a matrix produced by calculating a product of a matrix representing the rigidity of the variable rigidity element, which is changed by the rigidity change controller, and an inverse matrix of an inertia matrix of the actuator, which is determined based on the rotational angles of the rotary prime movers;
   a viscosity coefficient calculator for calculating a viscosity coefficient of the joints, using the self inherent vibrational component of the joints and a diagonal element of the inertia matrix; and
   a viscosity change controller for changing a viscosity coefficient of the variable viscosity coefficient element of the joints, such that the viscosity coefficient of the joints will be equivalent to the viscosity coefficient of the joints calculated by the viscosity coefficient calculator.

5. An actuating apparatus comprising:
an actuator including a link having a plurality of joints, a plurality of rotary prime movers for actuating the joints, and a plurality of flexible transmitting assemblies disposed respectively between the joints and the rotary prime movers, each of the flexible transmitting assemblies including a variable viscosity coefficient element a viscosity coefficient of which is variable in directions of rotation of the joints; and
a controller for controlling the actuator;
wherein the controller includes:
an inherent frequency calculator for using, as a self inherent vibrational component of the joints, the square root of a diagonal element of a matrix produced by calculating a product of a matrix representing the rigidity of the joints and an inverse matrix of an inertia matrix of the actuator, which is determined based on rotational angles of the rotary prime movers;
a viscosity coefficient calculator for calculating a viscosity coefficient of the joints, using a self inherent vibrational component of the joints and a diagonal element of the inertia matrix; and
a viscosity change controller for changing a viscosity coefficient of the variable viscosity coefficient element of the joints, such that the viscosity coefficient of the joints will be equivalent to the viscosity coefficient of the joints calculated by the viscosity coefficient calculator.

* * * * *